US011588797B2

(12) United States Patent
Hinh

(10) Patent No.: US 11,588,797 B2
(45) Date of Patent: Feb. 21, 2023

(54) VEHICLE DISTRIBUTED COMPUTING FOR ADDITIONAL ON-DEMAND COMPUTATIONAL PROCESSING

(71) Applicant: Ford Global Technologies, LLC, Dearborn, MI (US)

(72) Inventor: Robert Hinh, Cincinnati, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 17/021,236

(22) Filed: Sep. 15, 2020

(65) Prior Publication Data
US 2022/0086127 A1 Mar. 17, 2022

(51) Int. Cl.
    *H04L 29/06* (2006.01)
    *H04L 9/40* (2022.01)
    *H04L 9/32* (2006.01)
    *H04L 9/06* (2006.01)
    *H04L 9/00* (2022.01)

(52) U.S. Cl.
    CPC .......... *H04L 63/045* (2013.01); *H04L 9/0643* (2013.01); *H04L 9/3247* (2013.01); *H04L 9/50* (2022.05)

(58) Field of Classification Search
None
See application file for complete search history.

(56) References Cited

U.S. PATENT DOCUMENTS

| 10,796,371 | B1 * | 10/2020 | Floyd | G07C 5/008 |
|---|---|---|---|---|
| 2017/0120911 | A1 * | 5/2017 | Shin | B60W 30/16 |
| 2017/0364138 | A1 * | 12/2017 | Chen | G06F 1/3287 |
| 2020/0067703 | A1 * | 2/2020 | Zimmermann | H04L 9/0825 |
| 2020/0076884 | A1 * | 3/2020 | Li | H04L 67/108 |
| 2020/0082650 | A1 * | 3/2020 | Wahba | G07C 5/008 |
| 2020/0117690 | A1 * | 4/2020 | Tran | G06F 16/90332 |
| 2020/0249683 | A1 * | 8/2020 | Rosales | G01C 21/3407 |

(Continued)

FOREIGN PATENT DOCUMENTS

EP      3525157 A1 * 8/2019 ............... G05D 1/00

OTHER PUBLICATIONS

Wallace, "Blockchain meets the Automotive Industry and it's disruptive Implications", https://hackernoon.com/blockchain-meets-the-automotive-industry-and-its-disruptive-implications-1991e182182d, Jul. 3, 2019, 6 pages.

(Continued)

*Primary Examiner* — Jeffrey C Pwu
*Assistant Examiner* — Mayasa A. Shaawat
(74) *Attorney, Agent, or Firm* — Brandon Hicks; Kilpatrick Townsend & Stockton LLP

(57) ABSTRACT

Systems and techniques for vehicle distributed computing for on-demand computational capacity. Systems and techniques described herein enable distribution of discrete computational work requests to other vehicle systems through generation and awarding of smart contracts to locally positioned other vehicle systems bidding for the smart contracts. Data for processing the requests is encrypted and send to the vehicle winning the smart contract, which processes the request and returns the completed work product. Completion of the smart contract initiates transfer of value to the processing vehicle as incentive for processing the work load.

19 Claims, 8 Drawing Sheets

(56) References Cited

U.S. PATENT DOCUMENTS

2020/0361335 A1* 11/2020 Penilla .................... B60L 53/68
2021/0273819 A1* 9/2021 Rueckriemen ........ H04L 9/3268

OTHER PUBLICATIONS

Sharma, et al. "Block-VN: A Distributed Blockchain Based Vehicular Network Architecture in Smart City", https://doi.org/10.374S/JIPS.03.0065, vol. 13, No. 1, accepted Jan. 4, 2017, 12 pages.

Martin, "10 Applications for Blockchain in Connected Car Automotive", https://igniteoutsourcing.com/blockchain/blockchain-automotive-industry/, Nov. 29, 2018, 10 pages.

Liu, et al. "Blockchain-Enabled Security in Electric Vehicles Cloud and Edge Computing", IEEE Network, DOI: 10.1109/MNET.2018.1700344, vol. 32, Issue 3, Jun. 4, 2018, 6 pages.

Dorri, et al. "BlockChain: A Distributed Solution to Automotive Security and Privacy", DOI:10.1109/MCOM.2017.1700879, Apr. 1, 2017, 7 pages.

Yuan, et al. "Towards Blockchain-based Intelligent Transportation Systems", DOI: 10.1109/ITSC.2016.7795984, Nov. 1, 2016, 6 pages.

* cited by examiner

VEHICLE DISTRIBUTED COMPUTING FOR ADDITIONAL ON-DEMAND COMPUTATIONAL PROCESSING

BACKGROUND

Vehicle computer systems handle numerous computations and processing loads during operation. Computational tasks performed by vehicle systems such as infotainment, monitoring, and diagnostic processes increase as the complexity and capabilities of such systems increases. Additionally, the evolution of vehicles systems also leads to increased application complexity, which may also cause computational requirements to increase. Additional features, systems, and devices incorporated into vehicles may match or exceed the processing capabilities of on-board computing systems.

SUMMARY

In some embodiments, techniques for distributing computations from a vehicle computer system to computer systems of other vehicles or in other locations are described. The techniques involve providing a secure manner of communication and incentive for disparate computer systems to take on additional computation requests from a vehicle computer system at or near processing capacity. In some embodiments, the processing request is distributed via a smart contract on a public network, such as a public blockchain, and a smart contract is formed between the requesting vehicle and an available vehicle. Encryption methods such as public and private keys as well as random symmetric keys ensure secure transfer of data and information. Completed and validated requests complete the smart contract and initiate a value transfer from an account of the requesting vehicle to an account of the available vehicle. In some embodiments, a system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including generating, via a computer system of a first vehicle, a smart contract including a request to perform a computation for distribution to one or more vehicles via a public blockchain, the smart contract including task data, expiration of the smart contract, and deadline for completion of the request. The computer-implemented method also includes receiving identification information of a second vehicle of the one or more vehicles that is awarded the smart contract. The computer-implemented method also includes generating an encrypted random symmetric key, the encrypted random symmetric key encrypted using a public key of the second vehicle. The computer-implemented method also includes encrypting the request to perform the computation using the encrypted random symmetric key. The computer-implemented method also includes conveying the encrypted random symmetric key and the encrypted request to the second vehicle. The computer-implemented method also includes receiving a message from the second vehicle including completion data associated with the request. The computer-implemented method also includes generating a completion notification, where the completion notification includes instructions to transfer a predetermined value from a stored value account of the first vehicle to a stored value account of the second vehicle. Other embodiments of this aspect include corresponding computer systems, apparatus, and computer programs recorded on one or more computer storage devices, each configured to perform the actions of the methods.

One general aspect includes a vehicle computer system including one or more processors and a memory having stored thereon instructions that, when executed by the one or more processors, cause the one or more processors to perform various operations. The instructions cause the one or more processors to generate a smart contract including a request to perform a computation for distribution to one or more computing systems via a public blockchain, the smart contract including task data, expiration of the smart contract, and deadline for completion of the request. The instructions also cause the one or more processors to receive identification information of a computing system of the one or more computing systems that is awarded the smart contract. The instructions also cause the one or more processors to generate an encrypted random symmetric key, the encrypted random symmetric key encrypted using a public key of the computing system. The instructions also cause the one or more processors to perform the computation using the encrypted random symmetric key. The instructions also cause the one or more processors to convey the encrypted random symmetric key and the encrypted request to the computing system. The instructions also cause the one or more processors to receive a message from the computing system including completion data associate with the request. The instructions also cause the one or more processors to generate a completion notification, where the completion notification includes instructions to transfer a predetermined value from a stored value account associated with the vehicle computer system to a stored value account associated with the computing system.

One general aspect includes a non-transitory, computer-readable medium including instructions that, when executed by one or more processors, cause the one or more processors to perform various operations. The instructions cause the one or more processors to receive, at a local vehicle computing system, a smart contract including a request to perform a computation for a remote vehicle computing system, the request including task data, expiration of the smart contract, and a deadline for completion of the request. The instructions cause the one or more processors to generate a bid for the smart contract based at least in part on the task data and the deadline for completion of the request. The instructions cause the one or more processors to receive an encrypted random symmetric key and encrypted request from the remote vehicle computing system, the encrypted random symmetric key and the encrypted request both encrypted using a public key of the local vehicle computing system. The instructions cause the one or more processors to decrypt the encrypted random symmetric key using a private key of the local vehicle computing system. The instructions cause the one or more processors to decrypt the encrypted request using the decrypted random symmetric key. The instructions cause the one or more processors to perform the request. The instructions cause the one or more processors to convey a message to the remote vehicle computing system including completion data associated with the request.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
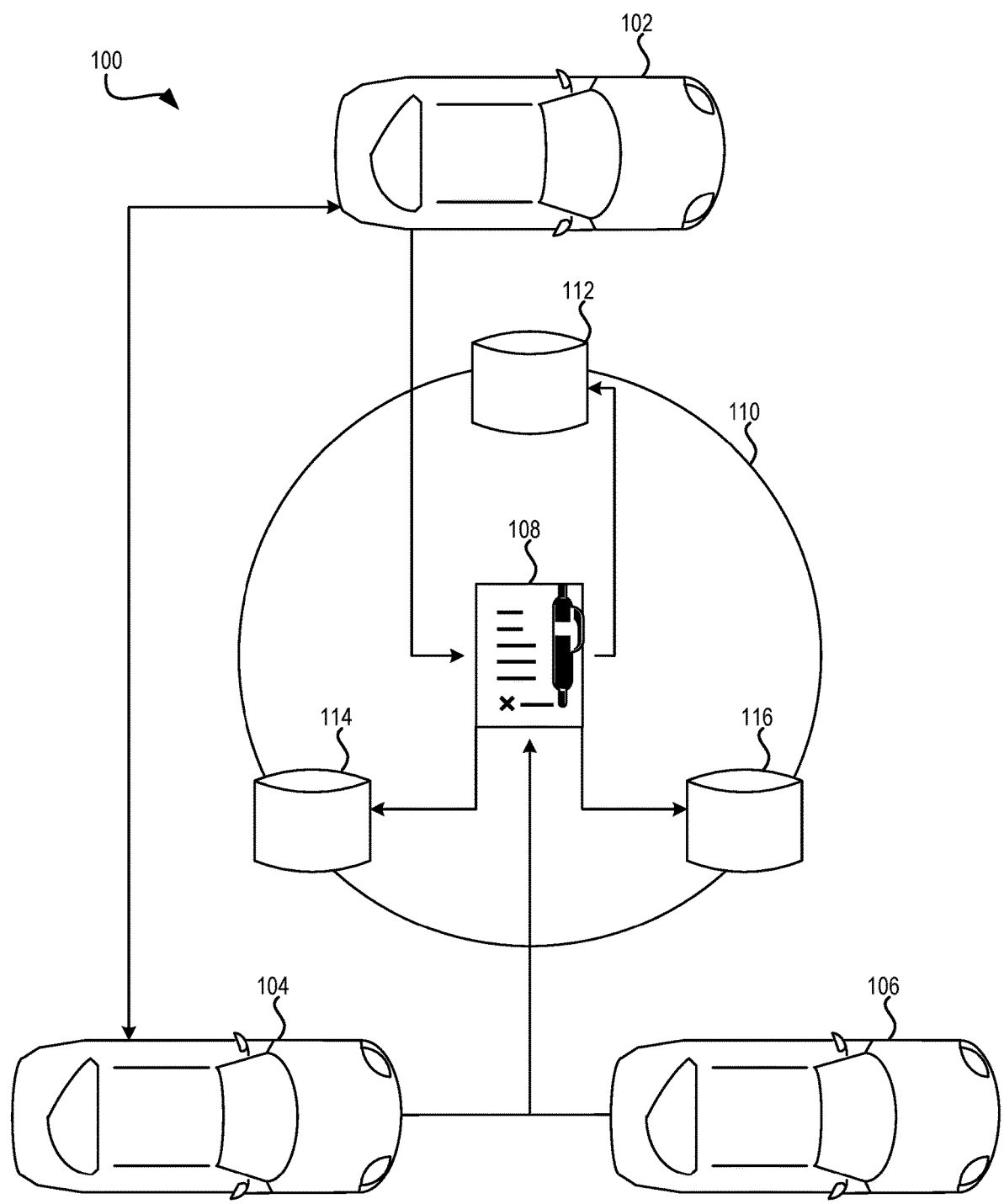
FIG. 1 illustrates a simplified diagram showing interactions between different vehicles during a request for additional computing resources, according to some embodiments.

Modern vehicles include many Electronic Control Units (ECUs) communicating with each other and with a vehicle computing system. As vehicle systems become more advanced and capable of additional functions, the processing power required of the vehicle computing system continually increases. Connected vehicles produce large amounts of data for a variety of reasons, such as vehicle health, safety information, geolocation data about the environment, etc. This data can be used for many analytical decisions to improve the driving experience (including safety, infotainment, etc.). However, depending on the task (and how many tasks), this could be very computationally expensive. In addition, there are possible times where the vehicle computing system will be overloaded with processing data requests. In some cases, subsequent features, add-ons, additions, or complex computations may additionally entirely occupy or exceed a processing capability of the vehicle computing system at any one point in time. In such cases, processing time for computations and requests increases, which increases a delay in receiving or processing important vehicle information or requests.

In some embodiments, vehicle computing systems may use telecommunications modems to off-load processing requests and data to the cloud where the requests can be fulfilled. However, these modems are limited with respect to bandwidth based on available hardware which may still limit the computations that may be performed. In the systems and techniques described herein, vehicle-to-vehicle and vehicle-to-anything communications enable processing data and requests without being limited by telecommunications bandwidth. Vehicle-to-vehicle and vehicle-to-anything communication is currently being developed and improved using 5G technology, but the functionality described herein is not limited to such technology. Rather, any communication network that allows vehicles to communicate wirelessly may be used such as satellite, Bluetooth®, radio, infrared, and other such network communication types. Additionally, the systems and techniques described herein provide incentives for nearby computing systems to process requests for processing of data from any particular vehicle computing system by providing for payment via value transfer following completion of the request.

In particular, the techniques and systems described herein use a public network, such as a public blockchain for computing systems to distribute processing loads to other computing systems on the network and incentivize processing of the requests. When a particular vehicle is at or near full utilization of processing capacity, the vehicle computing system will determine if additional processing capacity is needed. In instances where additional capacity is needed, requests for computations may be distributed or divided and distributed to the network. The work may be distributed by generating smart contracts and awarding the processing requests to the lowest bidders for the particular requests. Secure communications are established or exchanged between the requesting computing system and the available computing system through the use of encryption methods such as public and private keys as well as random symmetric keys. Following completion of the processing request, value is transferred from an account of the requesting vehicle system to the available computing system as a reward for completing the request.

The systems and methods described herein may be used to improve the responsiveness, effectiveness, and processing capacities of a vehicle computing system by distributing work to a public network of nearby computing systems. The processing capacity is thereby increased and incentivized through the use of value accounts to reward processing of requests for other systems and is not limited by bandwidth restrictions of telecommunications systems typically involved with uploading of processing requests to a cloud for additional processing capacity. The systems and methods herein use blockchain technology to dynamically find processing capacity to support a particular vehicle computing system within a particular region without requiring an internet connection.

Turning to FIG. 1, a simplified diagram 100 showing interactions between different vehicles as part of a public network during a request for additional computing resources is depicted, according to some embodiments. In the simplified diagram 100, a first vehicle 102 nears full usage or processing capacity, or may already exceed available processing capacity on-board the vehicle. A computing device of the vehicle 102 divides pending processing requests and determines which requests can be distributed for processing by other actors. This determination may be based on maintaining processing for safety, system health, or other critical features on-board while off-loading processing requests for auxiliary requests or non-essential computation requests for non-safety operations of the vehicle. The vehicle 102 creates a smart contract 108 for distribution via a blockchain network 110. The smart contract 108 includes information relating to the processing requests, size of the request, a deadline for completion of the requests, an expiration for bidding on the smart contract, an identity of the auctioning vehicle, a geofenced area or locality where the smart contract is valid, a public key of the vehicle 102, among other such information.

The smart contract 108 is validated on the blockchain network 110 to validate the request information is valid and also to verify that a stored value account 112 of the vehicle 102 has sufficient value to reward another vehicle 104 or 106 for processing the request under the smart contract by transferring value to stored value accounts 114 and 116 of the other vehicles 104 and 106.

Multiple other vehicles 104 and 106 on the blockchain network 110 bid on the smart contract 108 after validation and at the expiration of the bidding window, the lowest bidder amongst the other vehicles 104 and 106 is awarded the smart contract. The winning vehicle 104 receives the public key of the vehicle 102 in response to being awarded to the smart contract 108. The vehicle 102 then encrypts and conveys the processing request and associated data to the winning vehicle 104 through a secure communication means including encrypted message transfer as described herein. The winning vehicle 104 decrypts and performs the processing requests before returning the completed requests to the vehicle 102. The completed requests are validated at the vehicle 102 using an encrypted signature including the message digest between the vehicle 102 and the winning vehicle 104. Upon validation of the completed request, funds or value are transferred from a stored value account 112 of the vehicle 102 to a stored value account 114 of the winning vehicle 104.

In some examples, vehicle 102 may be an autonomous vehicle and vehicles 104 and 106 may be either autonomous or driver-piloted vehicles. Sensors of vehicle 102 capture information about the environment as well as operating status and health of the vehicle 102. The information gathered by various sensors of vehicle 102 may be used to determine commands that the vehicle 102 should execute, for example with respect to navigation, avoidance of obstacles, or to preserve vehicle system health. Vehicle 102 is dependent upon the information gathered by sensors and processed in or as close to real-time as possible. The vehicle 102 can offload processing requests to other nearby vehicles 104 and 106 to ensure calculations and commands for operations of the autonomous vehicle are completed as quickly as possible.

In some examples, when vehicle 102 has collected, via various on-board sensors, a large amount of telemetry data about the environment as well as about vehicle 102 itself, additional processing capacity may be needed to perform analytics. As the amount of data gathered by vehicles, such as autonomous vehicles, continues to increase, it may be increasingly important to ensure additional processing capacity is available.

In some examples, a driver request may exceed processing capacity of vehicle 102. The vehicle 102 may be an autonomous vehicle or may be a driver-piloted vehicle. For example, in a driver-piloted vehicle, the driver may request multiple routes to be calculated, all with varying configurations for each route (time to arrive, gas cost, modal forms, destination parking, etc.). All of this information needs to be calculated as close to simultaneously or real-time as possible so that the user does not need to wait for long. The vehicle 102 can offload computation of some route configurations to nearby vehicles 104 and 106 to ensure all requested routes are presented to the user as quickly as possible. In autonomous vehicles, the vehicle 102 may have requests that are not user-initiated, but are a result of piloting the autonomous vehicle or operations thereof. Some or all of the requests of the vehicle 102 may be offloaded to other computing devices. In some examples, only non-critical functions may be offloaded via the systems and methods described herein. Non-critical functions may include passenger requests, infotainment requests, auxiliary navigation requests, and such requests not required for piloting or safety of the vehicle 102.

Figure 2:
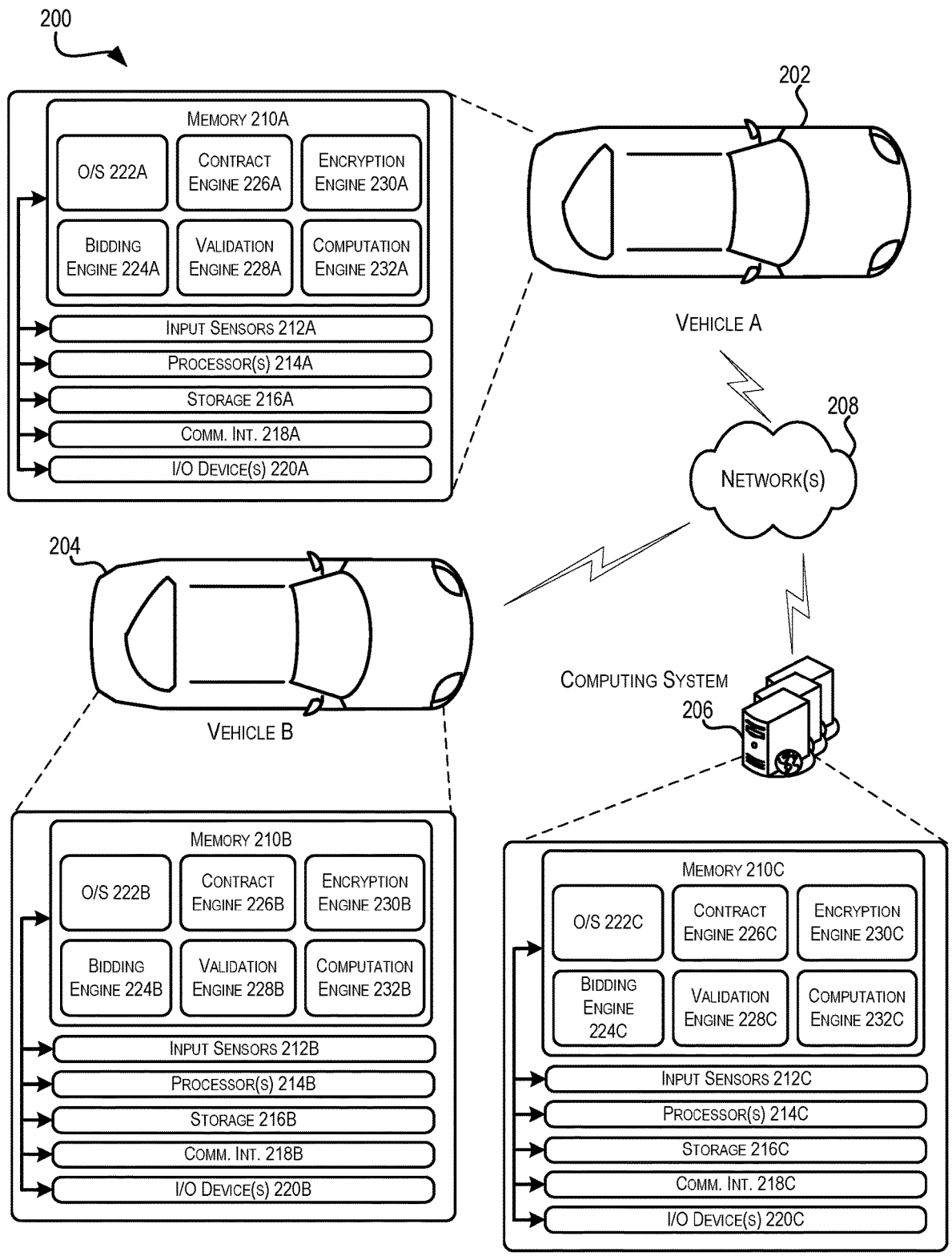
FIG. 2 illustrates a system architecture for systems involved in processing a request for additional computing resources, according to some embodiments.

FIG. 2 illustrates a system architecture for a system 200 involved in processing a request for additional computing resources, according to some embodiments. The system 200 includes a first vehicle 202, a second vehicle 204, and a computing system 206 in communication over a network 208. The system 200 may enable transactions such as briefly described with respect to the simplified diagram 100 of FIG. 1. The vehicles 202 and 204 each include computing systems such that the first vehicle 202, second vehicle 204, and computing system 206 each include similar or identical components, differentiated by the use of letters A, B, or C with respect to the components of the first vehicle 202, second vehicle 204, and computing system 206 respectively and referred to collectively without the use of appended letters A, B or C, for example memory 210 corresponding to a memory device of the first vehicle 202, second vehicle 204, and of the computing system 206 while memory 210A refers to the memory 210A of the first vehicle 202 only.

Figure 6:
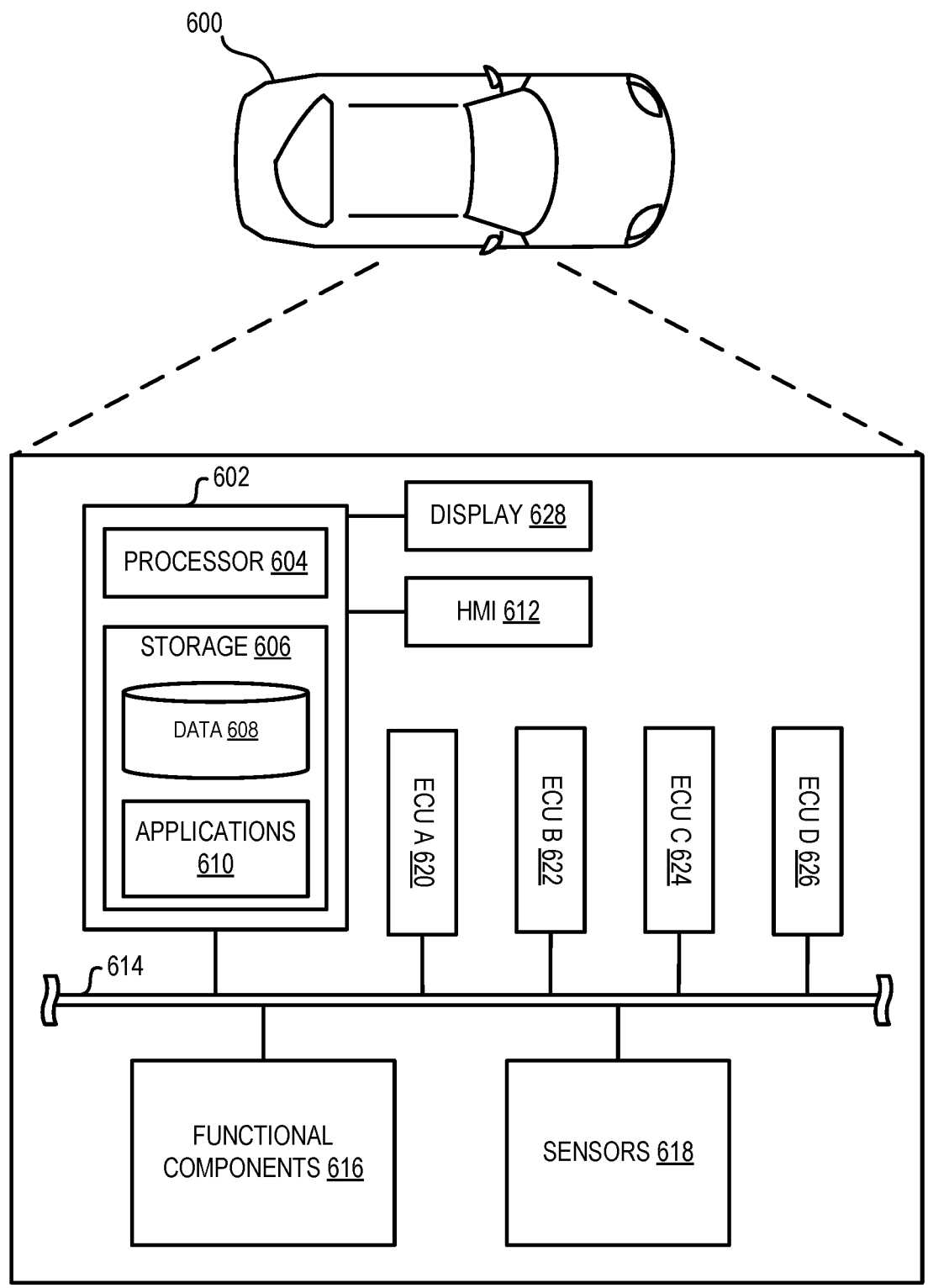
FIG. 6 illustrates a block diagram of a vehicle system, according to some embodiments.

The first vehicle 202 and second vehicle 204 may be any suitable vehicle system, such as described with respect to FIG. 6. The computing system 206 may be implemented as part of a vehicle or may be a standalone stationary computing system in the locality of the first vehicle 202 and second vehicle 204 such that communications over network 208 are enabled. In particular, first vehicle 202 and second vehicle 204 include computing systems capable of receiving data from a remote device and input devices, displaying information to a user, and outputting data to an external device or system. In some embodiments, the first vehicle 202 may be capable of establishing a communication session with the second vehicle 204 and/or the computing system 206 and transmitting/receiving data from those systems. Computing systems of the first vehicle 202, second vehicle 204, and computing system 206 may include the ability to download and/or execute applications and may include mobile communication devices as well as personal computers and thin-client devices.

In one illustrative configuration, the first vehicle 202, second vehicle 204, and computing system 206 may include at least one memory 210 and one or more processing units (or processor(s)) 214. The processor(s) 214 may be implemented as appropriate in hardware, computer-executable instructions, firmware or combinations thereof. Computer-executable instruction or firmware implementations of the processor(s) 214 may include computer-executable or machine executable instructions written in any suitable programming language to perform the various functions described. The first vehicle 202, second vehicle 204, and computing system 206 may also include one or more input sensors 212 for receiving user and/or environmental input such as vehicle component status data, environmental data, user input and user interactions with a user interface. There may be a variety of input sensors 212 capable of detecting user or environmental input, such as an accelerometer, a camera device, a depth sensor, a microphone, temperatures, pressures, and other operating conditions of the vehicle systems.

The memory 210 may store program instructions that are loadable and executable on the processor(s) 214, as well as data generated during the execution of these programs. Depending on the configuration and whether implemented within a vehicle 202 or 204 or standalone computing system 206, the memory 210 may be volatile (such as random access memory (RAM)) and/or non-volatile (such as read-only memory (ROM), flash memory, etc.). The first vehicle 202, second vehicle 204, and computing system 206 may also include additional storage 216, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM.

Turning to the contents of the memory 210 in more detail, the memory 210 may include an operating system 222 and one or more application programs or engines for implementing the features disclosed herein including at least a bidding engine 224, a contract engine 226, a validation engine 228, an encryption engine 230, and a computation engine 232. The memory 210 may also include system data (not shown), which provides information to be processed by and/or consumed by the engines 224-232.

For the purposes of this disclosure, any of the engines 224-232 may be any set of computer executable instructions installed upon, and executed from, a computing system of the first vehicle 202, second vehicle 204, or computing system 206. Engines 224-232 may be installed on the computing systems of the first vehicle 202, second vehicle 204, and computing system 206 by a manufacturer or by another entity. In some embodiments, the engines 224-232 may cause the first vehicle 202, second vehicle 204, and computing system 206 to establish a communication session with another one of the first vehicle 202, second vehicle 204, and computing system 206

In accordance with at least some embodiments, the bidding engine 224 may be configured to generate bids for smart contracts on the network 208. The bidding engine 224 may be configured to determine available processing capacity for completing requests from smart contracts provided on the network 208. The bidding engine 224 may be configured, such as through user-selectable settings, to bid on smart contracts or to stop bidding on contracts, as desired by the user. The bidding engine 224 may, in some examples provide a single bid for a smart contract, the single bid determined based on available processing capacity, for example with a higher bid submitted when processing capacity is more limited or at a premium either on-board the vehicle 202 or within the network 208. Processing capacity within the network 208 may be determined based on the number of or ratio of smart contracts available on the network 208 at any particular time as a function of total vehicles within a particular locality. The bidding engine 224 may also be configured to provide multiple subsequent bids, for example in response to bids from other vehicles or computing systems communicating over network 208. The bidding engine 224 may continue to present subsequently lower bids until a predetermined lowest threshold is reached, the bidding time expires, or the vehicle system 202 determines that the bidding price is too low based on available processing capacity on-board vehicle 202.

In accordance with at least some embodiments, the contract engine 226 may be configured to generate smart contracts, such as smart contract 108 of FIG. 1. The contract engine 226 may receive information from the computation engine 232 regarding calculations to be distributed and may generate smart contracts including information for distribution on the network 208 such as the workload that is to be completed (the type of processing rather than full details), the size of the workload, a deadline for completion, the expiration of bidding for the smart contract, identification of the vehicle soliciting bids, the area in which the smart contract is valid, the public key of the soliciting vehicle, and other such information. The contract engine 226 may also access a stored value account associated with the vehicle 202 or a driver of the vehicle 202 to ensure a value, such as a typical value based on previous history, is available to transfer to other computing systems 204 and 206 in exchange for processing requests.

In accordance with at least some embodiments, the validation engine 228 may be configured to validate a signature received from another vehicle in order to verify that a particular message or packet is from the other vehicle. The validation engine 228 may also be configured to generate a signature of the message digest between the vehicles involved in the transaction. The validation engine 228 validates the signature using the public key of the other vehicle. If the signature fails validation then no further work is performed on the request. When the signature is validated using the public key, the work request is carried out by the computation engine 232.

In accordance with at least some embodiments, the encryption engine 230 may be configured to encrypt and decrypt messages and data exchanged between vehicles 202 and 204 over network 208. The encryption engine 230 is configured to generate a random symmetric key for encrypting data for the processing request. The encryption engine 230 is also configured to encrypt the symmetric key to generate a cipher using its own private key. The receiving vehicle may use the public key to decrypt the random symmetric key and subsequently to decrypt the data using the random symmetric key. This ensures security of the work request and data that is transferred between the vehicles, such as to prevent malicious attacks by providing false completed work.

In accordance with at least some embodiments, the computation engine 232 may be configured to perform computations on-board the vehicle 202. The computation engine 232 may perform computations for the vehicle 202 as well as for other vehicles 204. The computation engine 232 may also be configured to determine when the processing capacity of the vehicle 202 is insufficient or too low to complete processing requests in a timely manner. The computation engine 232 may also be configured to divide processing requests into individual chunks that can be distributed to one or more additional vehicles 204 or computing systems 206 over network 208.

The first vehicle 202, second vehicle 204, and computing system 206 may also contain communications interface(s) 218 that enable the systems to communicate with any other suitable electronic devices. In some examples, the systems may include multiple sub-systems in communication with one another, such as multiple computing devices of each of the vehicles 202 and 204 in communication with one another. In some examples, the communication interface 218 may enable the vehicles 202 and 204 and computing system 206 to communicate with other electronic devices on a network, such as the blockchain network 110 of FIG. 1. For example, the vehicles 202 and 204 may include any number of different short range communication devices including Bluetooth wireless communications, near-field communications, and short range communications of any type. The vehicles 202 and 204 and computing system 206 may also include input/output (I/O) device(s) and/or ports 220, such as for enabling connection with various input devices from a user such as a voice input device, a touch input device, a display, etc.

In some embodiments, systems shown in FIG. 2 may communicate via a communication network. The communication network may include any one or a combination of many different types of networks, such as public blockchain networks, cable networks, the Internet, wireless networks, cellular networks, and other private and/or public networks. In addition, the communication network may comprise multiple different networks. For example, the first vehicle 202 and second vehicle 204 may utilize a Bluetooth communication system to communicate with one another, while the computing system 206 may be in communication with the vehicles 206 over other near-field communication systems.

Figure 3:
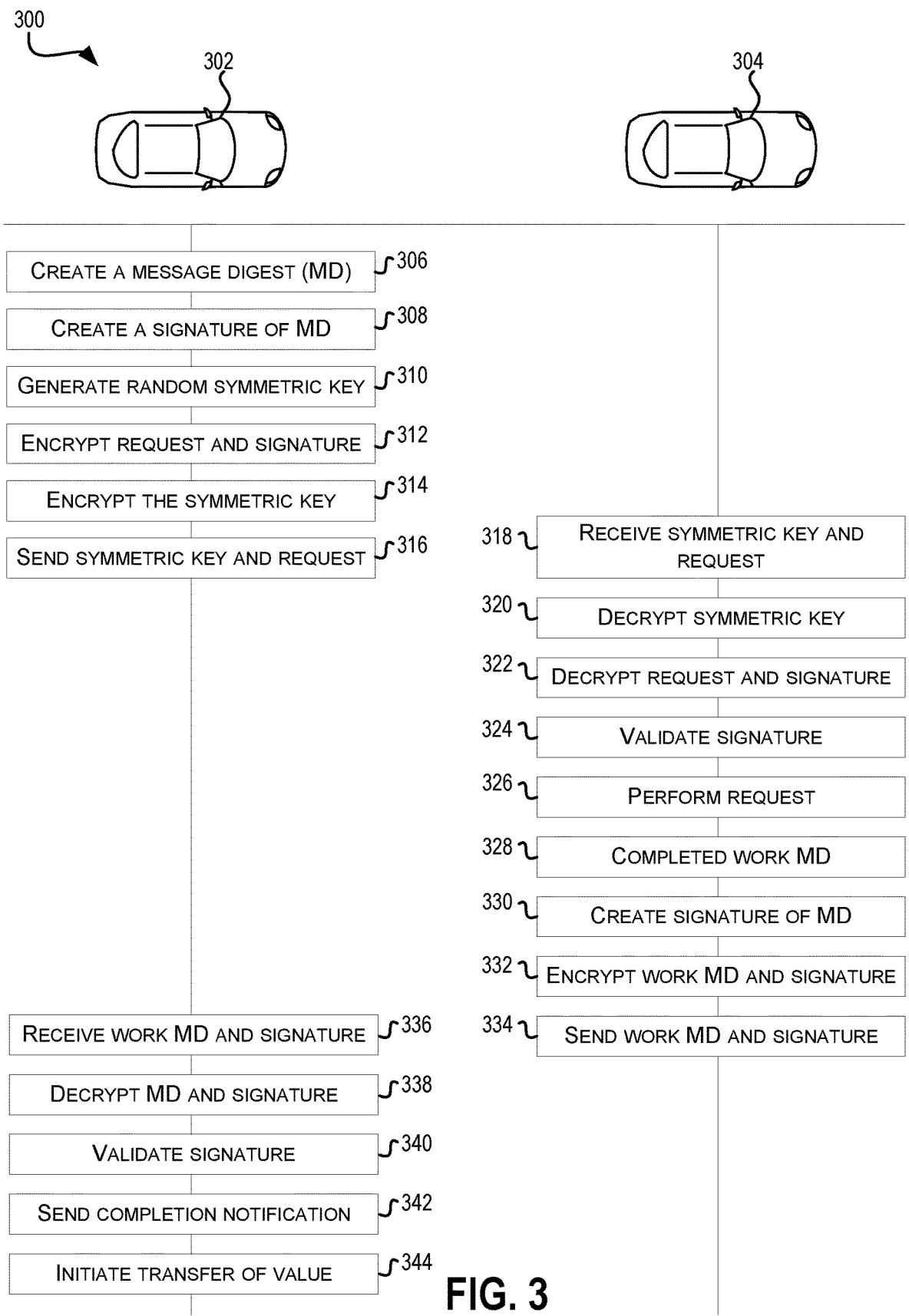
FIG. 3 illustrates a simplified diagram showing processes performed during a request for additional computing resources, according to some embodiments.

FIG. 3 illustrates a simplified diagram showing processes 300 performed during a request for additional computing resources, according to some embodiments. The processes 300 show steps performed on or by a first vehicle 302 and a second vehicle 304 when the first vehicle 302 requests additional processing capacity to perform requests. The second vehicle 304 has processing capacity and has previously been awarded a smart contract for the work via a public network, such as a public blockchain.

At 306, the first vehicle 302 creates a message digest including the work to be performed by the second vehicle 304. First vehicle 302 creates the message digest using a hash function. The message digest is for a particular discrete computation to be performed by the second vehicle 304, such as a discrete computation as determined as a part of a greater workload by the computation engine 232 of FIG. 2.

At 308, the first vehicle 302 creates a signature of the message digest using a private key of the first vehicle 302. The public key of the first vehicle 302 was previously provided to the second vehicle 304 when the second vehicle was awarded the smart contract and can be used to verify the signature of the message digest at the second vehicle 304 to ensure the message digest is from the first vehicle 302 and not from other actors on the network in addition to ensuring the message digest is unaltered when it arrives at the second vehicle.

At 310, the first vehicle generates a random symmetric key. The random symmetric key is subsequently used to encrypt the message digest including the work request at 312. The random symmetric key may not be as secure as other keys used for encryption of data, as any party with the key can access the encrypted data. The random symmetric key is generated for each message digest such that a symmetric key is only useful with a single particular message digest.

At 314, the first vehicle 302 encrypts the symmetric key using a public key of the second vehicle 304, received from the second vehicle 304 or otherwise available over the network. The symmetric key forms a cipher when encrypted using the public key and can securely be transferred to the second vehicle 304 for use in decrypting the message digest at the second vehicle 304.

At 316, the first vehicle sends the encrypted symmetric key and the encrypted message digest with the request to the second vehicle 304.

At 318, the second vehicle 304 receives the encrypted symmetric key and the encrypted message digest from the first vehicle 302 over a local network or direct communication means.

At 320, the second vehicle 304 decrypts the encrypted symmetric key using its own private key to obtain the symmetric key. The symmetric key is subsequently available for use in decrypting the message digest and signature previously encrypted by the first vehicle 302 at 322.

At 324, the second vehicle 304 validates the signature using the public key of the first vehicle 302. The signature was created using the private key of the first vehicle 302 such that validation can easily be performed based on the public key received at the second vehicle 304 after the second vehicle 304 is awarded the smart contract. If the signature is not validated, due to the second vehicle 304 not having the correct public key, then the work request is rejected.

At 326, the second vehicle 304 performs the processing request based on the decrypted message digest. The computation engine 232 of the second vehicle 304 performs the request.

At 328, the second vehicle creates a hash of the completed work request to generate a completed work message digest. The completed work message digest includes data and information based on completion of the request from the first vehicle 302.

At 330, the second vehicle 304 creates a signature for the completed message digest. The signature is created by the second vehicle 304 using a private key of the second vehicle 304.

At 332, the second vehicle 304 encrypts the completed work message digest as well as the signature before sending the encrypted message digest and encrypted signature to the first vehicle 302 at 334. The encryption is performed using the public key of the first vehicle 302.

At 336, the first vehicle 302 receives the encrypted completed work message digest and encrypted signature from the second vehicle. The first vehicle 302 subsequently decrypts the completed work message digest and the signature using the private key of the first vehicle 302 at 338.

At 340, the first vehicle 302 validates the signature using the public key of the second vehicle 304. If the signature is not validated, the completed work is not verified and the process halts and may re-start. If the signature is validated, the completed work message digest is verified as completed and a completion notification to the smart contract indicating the work has been completed and verified at 342.

At 344, the first vehicle 302 initiates transfer of value from a stored value account of the first vehicle 302 to a stored value account of the second vehicle 304. In some examples, the completion of the smart contract on the blockchain may initiate the transfer of value. The value transferred is based on the winning bid of the second vehicle 304 to initially win the smart contract.

Figure 4:
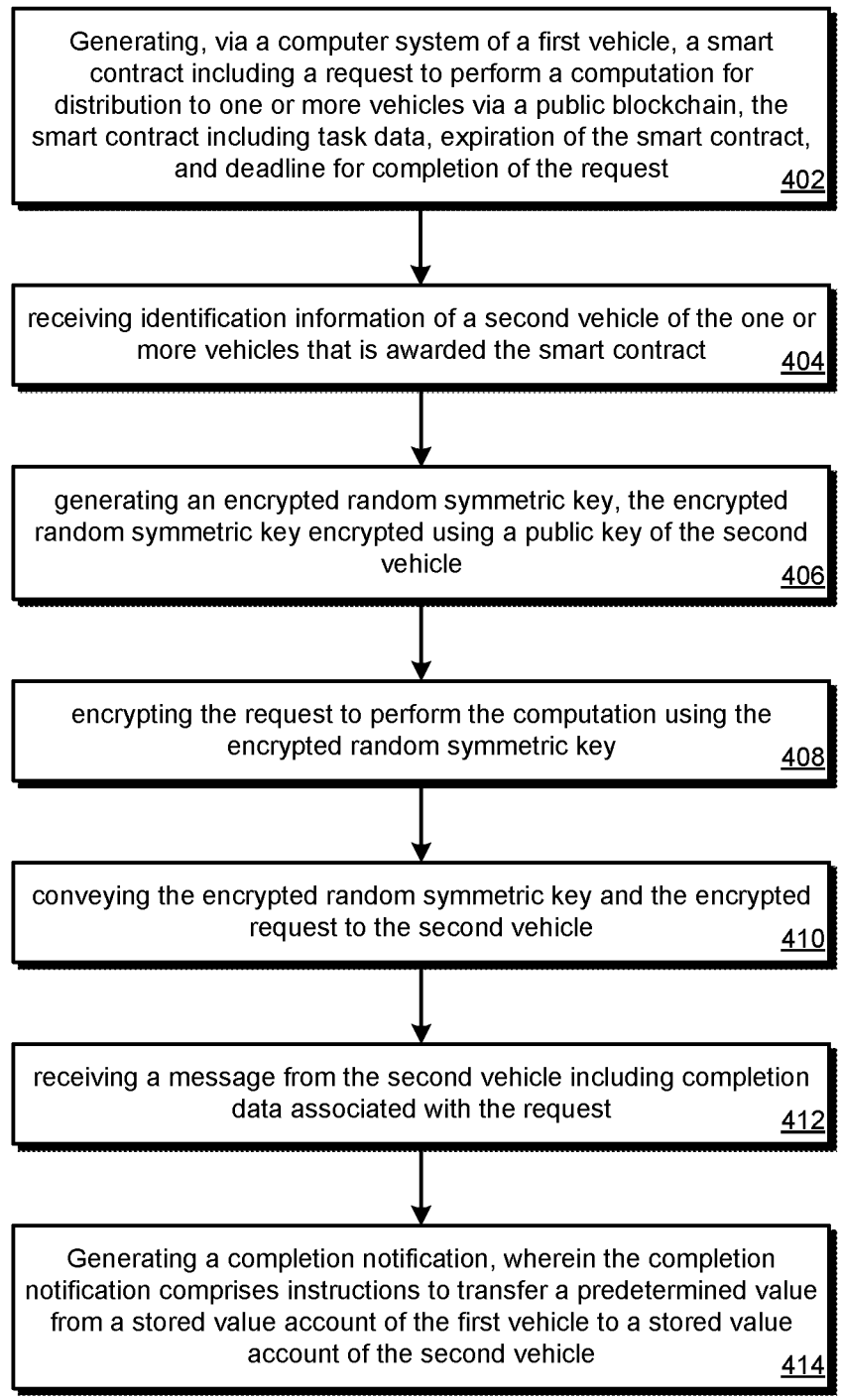
FIG. 4 illustrates a method for requesting additional computing resources, according to some embodiments.

FIG. 4 illustrates a method 400 for requesting additional computing resources, according to some embodiments. The method 400 may be performed by, for example, a computing system such as the computing systems of the first vehicle 202 or second vehicle 204 of FIG. 2 or may be performed by the computing system 602 of the vehicle system 600 of FIG. 6. Though the steps of method 400 are presented in sequential order, some or all of the steps may be performed in different sequences, including simultaneously, in some examples.

At step 402, a computing device of a first vehicle generates a smart contract including a request to perform a computation for distribution to one or more vehicles via a public blockchain, the smart contract including task data, expiration of the smart contract, and deadline for completion of the request. The computing device may generate the smart contract in response to receiving a request for processing data at the computing device and determining that the available processing capacity of the computing device is insufficient to perform the request computations. The smart contract may be distributed to a local area, such as a geofenced region via a public blockchain or other such network accessible by vehicle computing systems and other computing systems within range of the geofenced region. The smart contract may be validated on the public network, for example on the public blockchain to ensure the first vehicle has value in a stored value account to compensate a second vehicle for performing the request under the smart contract.

At step 404, the computing device receives identification information of a second vehicle of the one or more vehicles that is awarded the smart contract. The identification information may include a unique identifier, such as a Vehicle Identification Number (VIN) or other such identifying information. The identification information may also include information related to a public key associated with the second vehicle for use in secure communications between the first vehicle and the second vehicle.

At step 406, the computing device generates an encrypted random symmetric key, the encrypted random symmetric key encrypted using a public key of the second vehicle. The random symmetric key may be generated for use and association with the smart contract generated at 402, and only be used for a single work request.

At step 408, the computing device encrypts the request to perform the computation using the encrypted random symmetric key. Encrypting the request may include first encrypting the work request and subsequently encrypting the random symmetric key, as described in step 406.

At step 410, the computing device conveys the encrypted random symmetric key and the encrypted request to the second vehicle. The encrypted random symmetric key and the encrypted request may be conveyed over a public network, direct communication, such as short range communications, or any other communication means.

At step 412, the computing device receives a message from the second vehicle including completion data associated with the request. The completion data may be encrypted when received at the first vehicle. The second vehicle may have encrypted the completion data using the public key of the first vehicle or using any other suitable encryption means. The message may also include identifying information describing the smart contract or initial request such that the first vehicle can identify which smart contract, in a case of multiple, the completion data is associated with. In some examples, the message may be decrypted and verified, as described with respect to FIG. 3 above.

At step 414, the computing device generates a completion notification, wherein the completion notification comprises instructions to transfer a predetermined value from a stored value account of the first vehicle to a stored value account of the second vehicle. The completion notification may include a notification to the smart contract on the public blockchain indicating the request has been completed and verified. The smart contract may then initiate transfer of value from the stored value account of the first vehicle to the stored value account of the second vehicle. In some examples, the stored value for the smart contract may have been transferred to a holding account while the smart contract was pending and be delivered to the stored value account of the second vehicle upon completion of the smart contract.

Figure 5:
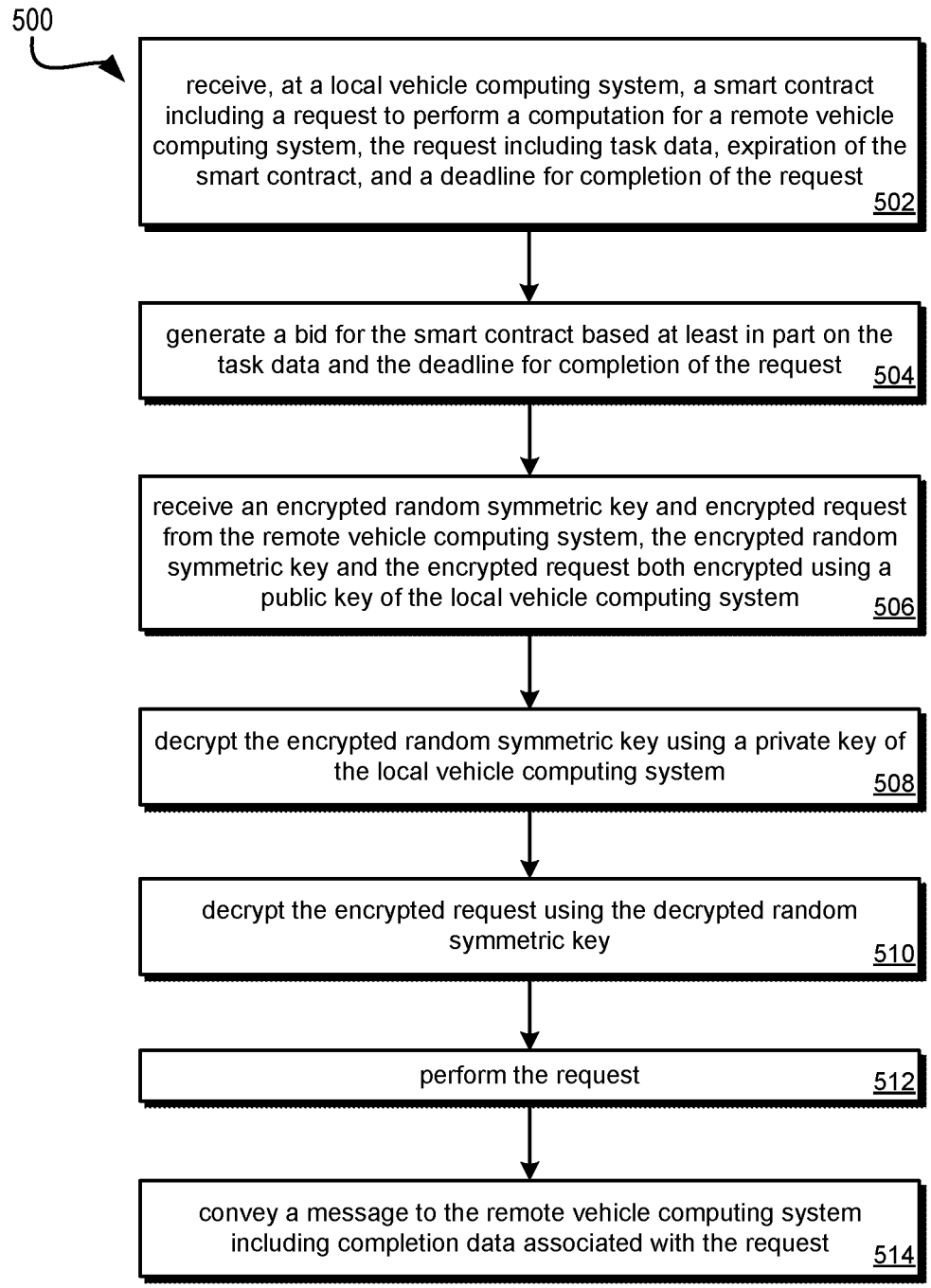
FIG. 5 illustrates a method for processing a request for additional computing resources, according to some embodiments.

FIG. 5 illustrates a method for processing a request for additional computing resources, according to some embodiments. The method 500 may be performed by, for example, a computing system such as the computing systems of the first vehicle 202, second vehicle 204, or computing system 206 of FIG. 2 or may be performed by the computing system 602 of the vehicle system 600 of FIG. 6. Though the steps of method 500 are presented in sequential order, some or all of the steps may be performed in different sequences, including simultaneously, in some examples.

At step 502, the computing device receives a smart contract including a request to perform a computation for a remote vehicle computing system, the request including task data, expiration of the smart contract, and a deadline for completion of the request. The smart contract may be received over a public network, a local area network, a public blockchain, or other such communication network. In some cases, the computing device may access an available smart contract on the network. The computing device may be configured to receive or access smart contracts, to participate in distributed computing for other vehicles or to ignore such smart contracts, as set by user preferences associated with the vehicle.

At step 504, the computing device generates a bid for the smart contract based at least in part on the task data and the deadline for completion of the request. The bid may be generated using the bidding engine 220 of FIG. 2 and be based on available computing resources on the vehicle, number of contracts or requests for distributed processing completion, and other such factors. The computing device may generate a single bid or multiple bids for the smart contract, for example to compete with other computing devices. The single bid or a first bid may be based on a history of bids for smart contracts on the public blockchain, or by the computing device of the vehicle itself. At the close of bidding on the smart contract, the computing device may be awarded the smart contract if the bid was the winning bid.

At step 506, the computing device receives an encrypted random symmetric key and encrypted request from the remote vehicle computing system, the encrypted random symmetric key and the encrypted request both encrypted using a public key of the local vehicle computing system. The received data may arrive at the computing device via a public network, private network, direct communication, or any other suitable communication means between the vehicle computing devices, especially communication means that are not limited by bandwidth of telecommunications devices.

At step 508, the computing device decrypts the encrypted random symmetric key using a private key of the local vehicle computing system. The symmetric key may be associated with only the single work request of the smart contract and not be re-used for security purposes.

At step 510, the computing device decrypts the encrypted request using the decrypted random symmetric key. By encrypting the random symmetric key and subsequently using the random symmetric key to decrypt the request, the request is secure and also easily accessed by each party, having the private or public keys rather than relying solely on the symmetric key, which may not be as secure.

At step 512, the computing device performs the request. The request may be performed by the computation engine 232 as performed by the processor of the computing device.

At step 514, the computing device conveys a message to the remote vehicle computing system including completion data associated with the request. In some examples, the message may be encrypted before conveying to the remote vehicle computing system. The encryption may be performed by the encryption engine 230 and use the public key of the remote vehicle computing system. Following conveyance of the message, the message may be verified and value may be transferred to the stored value account of the local vehicle computing system as compensation for completing the request.

Figure 7:
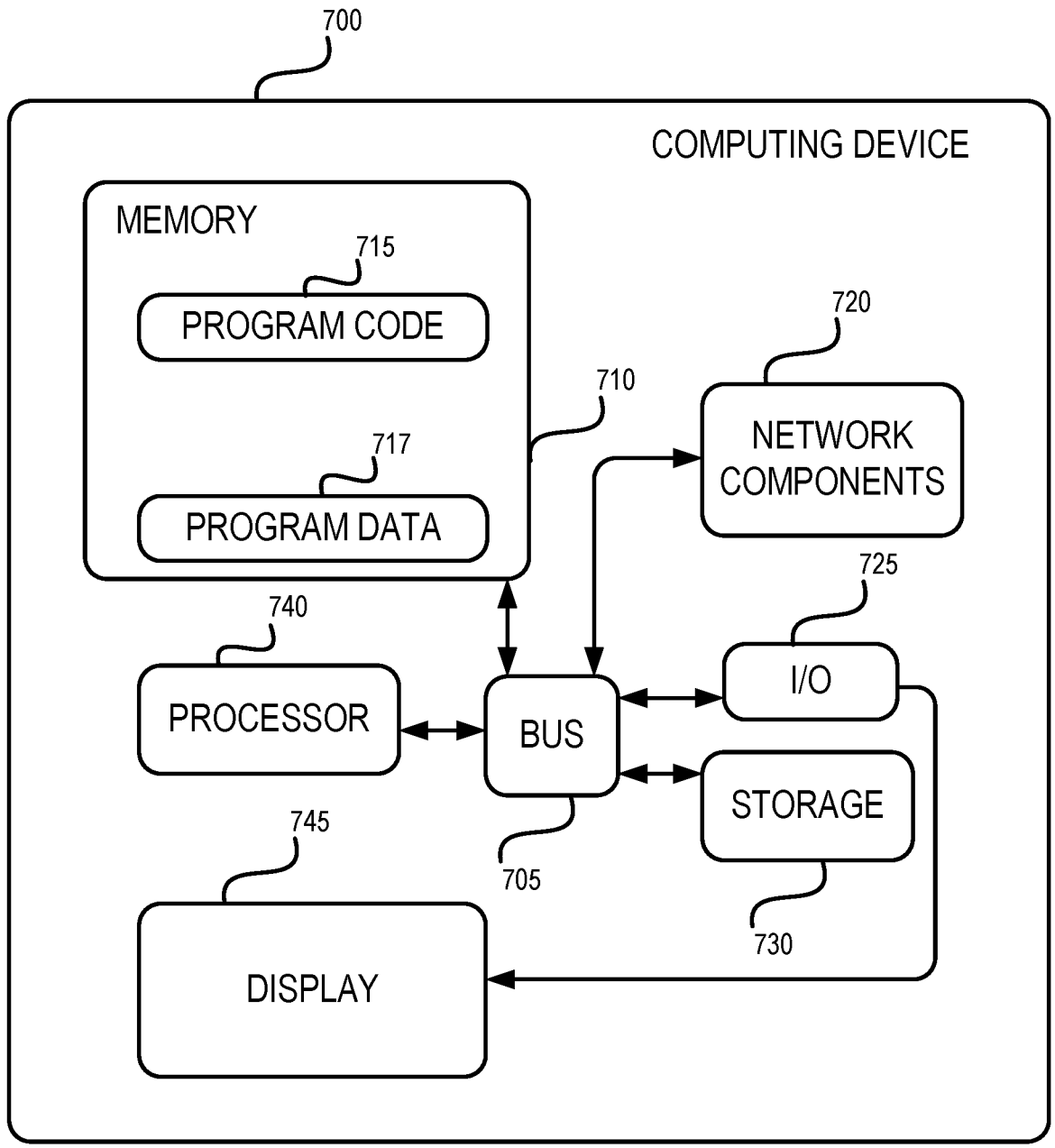
FIG. 7 illustrates a computer system, according to some embodiments.

Any suitable computing system or group of computing systems can be used for performing the operations or methods described herein. For example, FIG. 6 illustrates a vehicle system including a computing system 602 as well as multiple ECUs which may perform some or all of the functions described herein. FIG. 7 further depicts an example of a computing device 700 that may be at least a portion of computing system 602.

FIG. 6 illustrates a block diagram of a vehicle system 600, according to some embodiments. The vehicle system 600 may include a computing system 602 configured to communicate over an in-vehicle network 614. The computing system 602 includes a processor 604 and storage 606. While a vehicle system 600 is shown in FIG. 6, the example components as illustrated are not intended to be limiting. Indeed, the vehicle system 600 may have more or fewer components, and additional or alternative components and/or implementations may be used. It should be noted that the use of a vehicle system 600 environment is illustrative, as the components and functionality may be utilized in other types of systems such as flight control system in an airplane, or a medical device or industrial machine.

The vehicle system 600 may include various types of automobile, crossover utility vehicle (CUV), sport utility vehicle (SUV), truck, recreational vehicle (RV), boat, plane or other mobile machine for transporting people or goods. In many cases, the vehicle system 600 may be powered by an internal combustion engine. As another possibility, the vehicle system 600 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 600 may vary, the capabilities of the vehicle system may correspondingly vary. As some other possibilities, vehicle system 600 may have different capabilities with respect to passenger capacity, towing ability and capacity, and storage volume.

The computing system 602 may include a Human Machine Interface (HMI) 612 and a display 628 for user interaction with the computing system 602. An example computing system 602 may be the SYNC™ system provided by FORD MOTOR COMPANY™ of Dearborn, Mich. In some examples the display 628 may include a vehicle infotainment system including one or more displays. The HMI 612 may be configured to support voice command and BLUETOOTH™ interfaces with the driver and driver carry-on devices, receive user input via various buttons or other controls, and provide vehicle status information to a driver or other vehicle system 600 occupants. For instance, the computing system 602 may interface with one or more buttons or other HMI 612 configured to invoke functions on the computing system 602 (e.g., steering wheel audio buttons, a push-to-talk button, instrument panel controls, etc.). The computing system 602 may also drive or otherwise communicate with the display 628 configured to provide visual output to vehicle occupants, e.g., by way of a video controller. In some cases, the display 628 may be a touch screen further configured to receive user touch input via the video controller, while in other cases the display 628 may be a display only, without touch input capabilities. In an example, the display 628 may be a head unit display included in a center console area of the vehicle system 600. In another example, the display 628 may be a screen of a gauge cluster of the vehicle system 600.

The computing system 602 may further include various types of computing apparatus in support of performance of the functions of the computing system 602 described herein. In an example, the computing system 602 may include one or more processors 604 configured to execute computer instructions, and a storage 606 medium on which computer-executable instructions and/or data may be maintained. A computer-readable medium (also referred to as a processor-readable medium or storage 606) includes any non-transitory (e.g., tangible) medium that participates in providing data (e.g., instructions) that may be read by a computer (e.g., by the one or more processors 604). In general, the processor 604 receives instructions and/or data, e.g., from the storage 606, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 606 may include divisions for data 608 and applications 610. The data 608 may store information such as databases and other such information. The applications 610 may store the computer-executable instructions or other such instructions executable by the processor 604.

The computing system 602 may be configured to communicate with mobile devices of the vehicle system 600 occupants. The mobile devices may be any of various types of portable computing device, such as cellular phones, tablet computers, smart watches, laptop computers, portable music players, or other devices capable of communication with the computing system 602. As with the computing system 602, the mobile device may include one or more processors configured to execute computer instructions, and a storage medium on which the computer-executable instructions and/or data may be maintained. In some examples, the computing system 602 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 602 may communicate with the mobile device over a wired connection, such as via a USB connection between the mobile device and a Universal Serial Bus (USB) subsystem of the computing system 602.

The computing system 602 may be further configured to communicate with other components of the vehicle system 600 via one or more in-vehicle networks 614. The in-vehicle networks 614 may include one or more of a vehicle controller area network (CAN), an Ethernet network, or a media oriented system transfer (MOST), as some examples. The in-vehicle networks 614 may allow the computing system 602 to communicate with other units of the vehicle system 600, such as ECU A 620, ECU B 622, ECU C 624, and ECU D 626. The ECUs 620, 622, 624, and 626 may include various electrical or electromechanical systems of the vehicle system 600 or control various subsystems of the vehicle system 600. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 600); a radio transceiver module configured to communicate with key fobs or other vehicle system 600 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 600 location and heading information, and various other vehicle ECUs configured to corporate with the computing system 602. The subsystems controlled by the various ECUs may include functional components 616 of the vehicle system 600 including elements such as the powertrain, engine, brakes, lights, steering components, and the like. Additionally, some or all of the functional components 616 may include sensors 618 as well as additional sensors equipped to the vehicle system 600 for detecting various states, positions, proximity, temperature, and the like of the vehicle system 600 and subsystems thereof. The ECUs 620, 622, 624, 626 may communicate with the computing system 602 as well as the functional components 616 and the sensors 618 over the in-vehicle network 614. While only four ECUs are depicted in FIG. 6, any number (more or fewer) of ECUs may be included in vehicle system 600.

FIG. 7 illustrates a block diagram of an example of a computing device 700. Computing device 700 can be any of the described computers herein including, for example, computing system 602 within the vehicle system 600 of FIG. 6 as well as ECUs 620, 622, 624, 626. The computing device 700 can be or include, for example, an integrated computer, a laptop computer, desktop computer, tablet, server, or other electronic device.

The computing device 700 can include a processor 740 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 700. Memory 710 can store the program code 715, program data 717, or both. In some examples, the computing device 700 can include input/output ("I/O") interface components 725 (e.g., for interfacing with a display 745, keyboard, mouse, and the like) and additional storage 730.

The computing device 700 executes program code 715 that configures the processor 740 to perform one or more of the operations described herein. Examples of the program code 715 include, in various embodiments logic flowchart described with respect to FIG. 1 above. The program code 715 may be resident in the memory 710 or any suitable computer-readable medium and may be executed by the processor 740 or any other suitable processor.

The computing device 700 may generate or receive program data 717 by virtue of executing the program code 715. For example, sensor data, trip counter, authenticated messages, trip flags, and other data described herein are all examples of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a computing device 700 with a processor 740, the system can include any number of computing devices 700 and any number of processor 740. For example, multiple computing devices 700 or multiple processor 740 can be distributed over a wired or wireless network (e.g., a Wide Area Network, Local Area Network, or the Internet). The multiple computing devices 700 or multiple processor 740 can perform any of the steps of the present disclosure individually or in coordination with one another.

Figure 8:
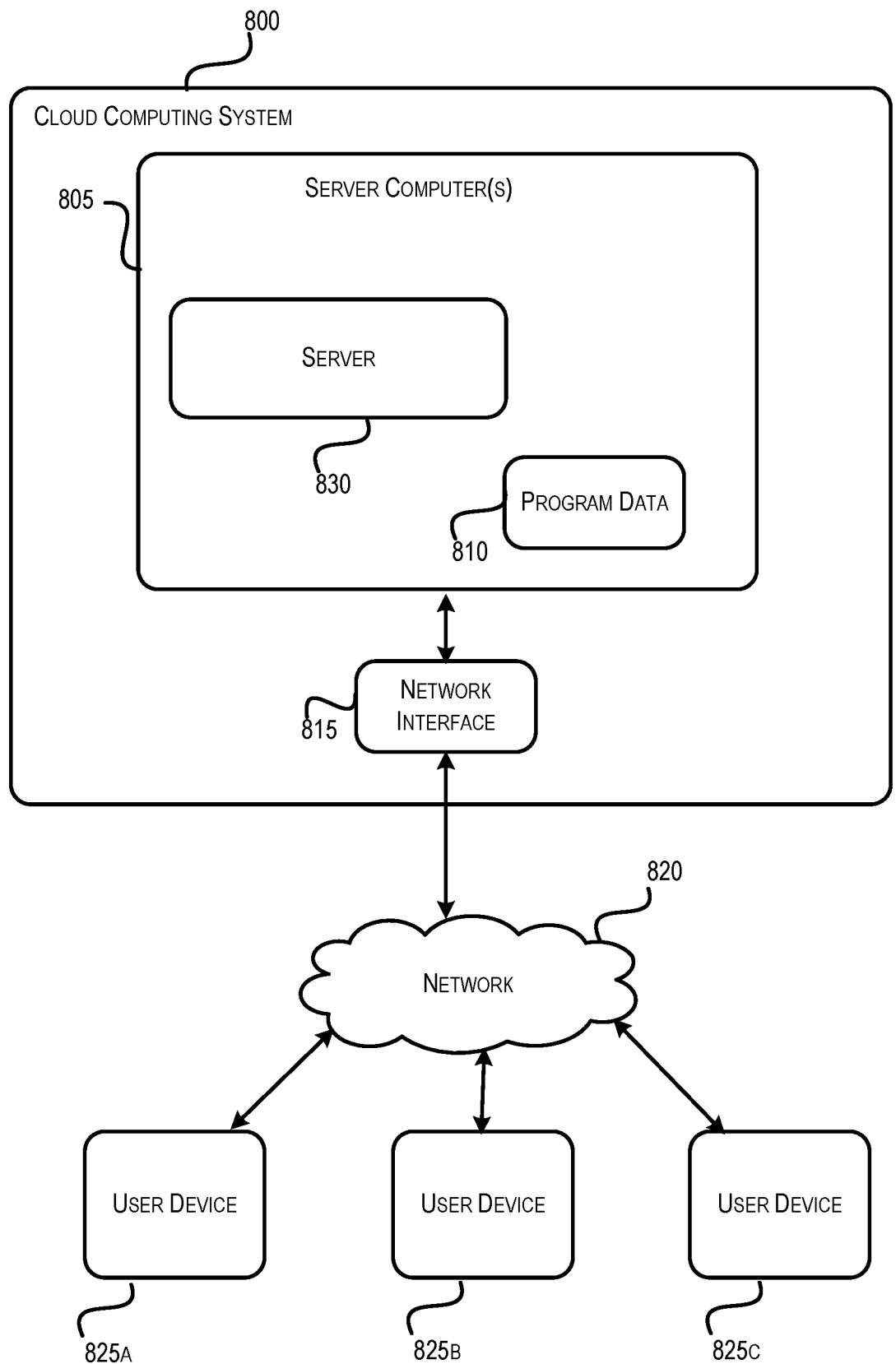
FIG. 8 illustrates a cloud computing system. according to some embodiments.

In some embodiments, the functionality described herein, including the network between computing devices and processing of requests may be offered as cloud services by a cloud service provider. For example, the network connection between the computing devices of separate vehicles may include a cloud computing network. Additionally, the blockchain network may be implemented over a cloud computing network. For example, FIG. 8 depicts an example of a cloud computing system 800 that may provide network connections, cloud networking, and computing resources to various user devices 825a, 825b, and 825c across a data network 820. User devices 825a, 825b, and 825c could be examples of a vehicle 202 or computing system of a vehicle 202 described above. In the example, the service may be offered under a Software as a Service (SaaS) model. One or more users may subscribe to the service, and the cloud computing system provides access to a blockchain network, one or more other computing devices, and computing resources to provide the service to subscribers. In an example, the cloud computing system 800 may prove access to or be offered as Blockchain-as-a-service (BaaS). The Baas infrastructure may enable operations of the methods and systems described herein over a cloud-based infrastructure operating blockchain applications. The cloud computing system 800 may include one or more remote server computers 805.

The remote server computers 805 include any suitable non-transitory computer-readable medium for storing program code and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 805 can include volatile memory, non-volatile memory, or a combination thereof.

One or more of the server computers 805 execute the program data 810 that configures one or more processors of the server computers 805 to perform one or more of the operations described herein including validating smart contracts over the public blockchain, distributing computing resource requests, and any other functions described herein. As depicted in the embodiment in FIG. 8, the one or more server computers 805 provide the services to perform the actions carried out in system 200 as described with respect to FIG. 2. Any other suitable systems or subsystems that perform one or more operations described herein (e.g., one or more development systems for communicating with stored value accounts or for validating smart contracts) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 820.

The cloud computing system 800 also includes a network interface device 815 that enable communications to and from cloud computing system 800. In certain embodiments, the network interface device 815 includes any device or group of devices suitable for establishing a wired or wireless data connection to the data networks 820. Non-limiting examples of the network interface device 815 include an Ethernet network adapter, a modem, and/or the like. The server 830 is able to communicate with the user devices 825a, 825b, and 825c via the data network 820 using the network interface device 815.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method, comprising:
   determining, by a computer system of a first vehicle, that a computation workload associated with a computation exceeds available computing resources of the computer system, wherein the computer system is configured to perform computations on-board the first vehicle;
   generating, by the computer system of the first vehicle, a smart contract for distribution to one or more vehicles via a public blockchain, the smart contract including (1) a request to perform the computation by at least one of the one or more vehicles, (2) task data associated with the computation, (3) expiration of the smart contract, and (4) deadline for completion of the request, wherein the task data of the smart contract describes a type of request to be performed and computing resource requirements;
   receiving identification information of a second vehicle among the one or more vehicles that is awarded the smart contract;
   generating an encrypted random symmetric key specific to the request, the encrypted random symmetric key encrypted using a public key of the second vehicle;
   encrypting the request to perform the computation using the encrypted random symmetric key;
   conveying the encrypted random symmetric key and the encrypted request to the second vehicle;
   receiving a message from the second vehicle including completion data associated with the request; and
   generating and incorporating, by the computer system of the first vehicle, a completion notification to the smart contract on the public blockchain, wherein the completion notification indicates that the request has been completed and verified, and wherein the completion notification comprises instructions to transfer a predetermined value from a stored value account of the first vehicle to a stored value account of the second vehicle.

2. The computer-implemented method of claim 1, wherein generating the smart contract comprises:
   receiving a request for the computation workload;
   dividing the computation workload into one or more requests; and
   selecting the request of the one or more requests for inclusion in the smart contract.

3. The computer-implemented method of claim 2, wherein selecting one request of the one or more requests for inclusion in the smart contract comprises:
   selecting the request such that remaining one or more requests do not exceed the available computing resources of the computer system.

4. The computer-implemented method of claim 1, wherein the one or more vehicles are located within a predetermined distance of the first vehicle.

5. The computer-implemented method of claim 1, wherein the one or more vehicles include computing systems with available computing resources to complete the request.

6. The computer-implemented method of claim 1, further comprising providing a public key of the first vehicle and communication instructions to the second vehicle.

7. A vehicle computer system of a vehicle, comprising:
   one or more processors; and
   a memory having stored thereon instructions that, when executed by the one or more processors, cause the one or more processors to:
      determine that a computation workload associated with a computation exceeds available computing resources of the vehicle computer system, wherein the vehicle computer system is configured to perform computations on-board the vehicle;
      generate a smart contract for distribution to one or more computing systems via a public blockchain, the smart contract including (1) a request to perform the computation by at least one of the one or more vehicles, (2) task data associated with the computation, (3) expiration of the smart contract, and (4) deadline for completion of the request, wherein the task data of the smart contract describes a type of request to be performed and computing resource requirements;
      receive identification information of a computing system of the one or more computing systems that is awarded the smart contract;
      generate an encrypted random symmetric key specific to the request, the encrypted random symmetric key encrypted using a public key of the computing system;
      encrypt the request to perform the computation using the encrypted random symmetric key;
      convey the encrypted random symmetric key and the encrypted request to the computing system;
      receive a message from the computing system including completion data associate with the request; and
      generate and incorporate a completion notification to the smart contract on the public blockchain, wherein the completion notification indicates that the request has been completed and verified, and wherein the completion notification comprises instructions to transfer a predetermined value from a stored value account associated with the vehicle computer system to a stored value account associated with the computing system.

8. The vehicle computer system of claim 7, wherein the computing system is a computing system of a separate vehicle.

9. The vehicle computer system of claim 7, wherein the computing system is a stationary computing system.

10. The vehicle computer system of claim 7, wherein the computing system is a cloud computing system.

11. The vehicle computer system of claim 7, wherein encrypting the request comprises:
    generating a hash of the request to generate a message digest; and
    generating a signature of the message digest using a private key of the computing system, and wherein encrypting the request comprises encrypting the hash and the signature.

12. The vehicle computer system of claim 7, wherein generating the smart contract comprises determining whether the vehicle has a stored value account balance that exceeds a predetermined value.

13. The vehicle computer system of claim 7, wherein the one or more computing systems comprise one or more vehicle computing systems, and wherein owners of the one or more vehicle computing systems have previously authorized use of computing resources to process requests from other vehicles.

14. The vehicle computer system of claim 7, wherein the one or more computing systems are within a predetermined distance of the vehicle computer system and the one or more computing systems are in communication with the vehicle computer system over a short-range communication system.

15. A non-transitory, computer-readable medium comprising instructions that, when executed by one or more processors, cause the one or more processors to:
   receive, at a local vehicle computing system of a vehicle, a smart contract including (1) a request to perform a computation for a remote vehicle computing system, (2) task data, (3) expiration of the smart contract, and (4) a deadline for completion of the request, wherein the local vehicle computing system is configured to perform computations on-board the vehicle, wherein the task data of the smart contract describes a type of request to be performed and computing resource requirements;
   determine, by the local vehicle computing system, available resources for performing the computation,
   generate a bid for the smart contract based at least in part on the available resources for performing the computation, the task data and the deadline for completion of the request;
   receive an encrypted random symmetric key and encrypted request from the remote vehicle computing system, the encrypted random symmetric key and the encrypted request both encrypted using a public key of the local vehicle computing system;
   decrypt the encrypted random symmetric key using a private key of the local vehicle computing system;
   decrypt the encrypted request using the decrypted random symmetric key;
   perform the request using the available resources at the local vehicle computing system;
   convey a message to the remote vehicle computing system including completion data associated with the request.

16. The non-transitory, computer-readable medium of claim 15, wherein the instructions comprise further instructions, that, when executed by the one or more processors, cause the one or more processors to:
  encrypt the completion data using the private key of the local vehicle computing system before conveying the message to the remote vehicle computing system.

17. The non-transitory, computer-readable medium of claim 15, wherein the smart contract is received via a public blockchain.

18. The non-transitory, computer-readable medium of claim 15, wherein the remote vehicle computing system is within a predetermined distance of the vehicle.

19. The non-transitory, computer-readable medium of claim 15, wherein the task data of the smart contract describes a type of request to be performed and computing resource requirements.

\* \* \* \* \*